(12) United States Patent
Pokotylo (10) Patent No.: US 9,140,240 B2
(45) Date of Patent: Sep. 22, 2015

(54) REDUCING THE VISUAL IMPACT OF OFFSHORE WIND FARMS

(71) Applicant: Justin B. Pokotylo, Colts Neck, NJ (US)

(72) Inventor: Justin B. Pokotylo, Colts Neck, NJ (US)

( * ) Notice: Subject to any disclaimer, the term of this patent is extended or adjusted under 35 U.S.C. 154(b) by 461 days.

(21) Appl. No.: 13/653,495

(22) Filed: Oct. 17, 2012

(65) Prior Publication Data

US 2014/0105745 A1    Apr. 17, 2014

(51) Int. Cl.
*F03D 11/00* (2006.01)
*F03D 11/04* (2006.01)

(52) U.S. Cl.
CPC ............... *F03D 11/00* (2013.01); *F03D 11/04* (2013.01); *F05B 2250/28* (2013.01); *F05B 2270/80* (2013.01); *F05B 2270/804* (2013.01); *Y02E 10/722* (2013.01); *Y02E 10/727* (2013.01)

(58) Field of Classification Search
CPC ............ F03D 11/0041; F03D 11/0083; F03D 11/0091; F03D 11/04; F05B 2250/18; F05B 2250/28; F05B 2270/80; F05B 2270/804; Y02E 10/727
See application file for complete search history.

(56) References Cited

U.S. PATENT DOCUMENTS

| | | | | |
|---|---|---|---|---|
| 2,292,848 | A * | 8/1942 | Robson | 114/15 |
| 5,220,631 | A * | 6/1993 | Grippin | 385/115 |
| 6,459,076 | B1 * | 10/2002 | Schlenker | 250/205 |
| 6,805,957 | B1 * | 10/2004 | Santos et al. | 428/400 |
| 7,271,759 | B1 * | 9/2007 | Bofinger et al. | 342/3 |
| 7,775,919 | B2 * | 8/2010 | Oswald et al. | 473/578 |
| 2010/0270806 | A1 * | 10/2010 | Estrada | 290/55 |
| 2011/0215585 | A1 * | 9/2011 | Caires | 290/55 |

* cited by examiner

*Primary Examiner* — Ninh H Nguyen
(74) *Attorney, Agent, or Firm* — John C. Pokotylo; Straub & Pokotylo (57) ABSTRACT

A wind turbine includes: (a) a plurality of blades; and (b) a base supporting the plurality of blades and having a first portion provided with a first type of camouflage and a second portion provided with a second type of camouflage that differs from the first type of camouflage. Such a wind turbine may be included in a system further including: at least one light emitting element which, when activated, directs light onto a surface of the wind turbine; a power source for powering the at least one light emitting element; and a controller for controlling at least one of (A) a quantity of light emitted by the at least one light emitting element, (B) a color of light emitted by the at least one light emitting element, and (C) a pattern of light emitted by the at least one light emitting element.

19 Claims, 12 Drawing Sheets

REDUCING THE VISUAL IMPACT OF OFFSHORE WIND FARMS

§0. PRIORITY CLAIM

This application claims the benefit of U.S. Provisional Patent Application Ser. No. 61/611,889 (incorporated herein by reference and referred to as "the '889 provisional"), titled "REDUCING THE VISUAL IMPACT OF OFFSHORE WIND FARMS," filed on Mar. 16, 2012, and listing Justin Pokotylo as the inventor. The present invention is not limited to requirements of the particular embodiments described in the '889 provisional.

§1. BACKGROUND OF THE INVENTION

§1.1 Field of the Invention

My invention concerns wind generators, such as those used in offshore wind farms for example.

§1.2 Background Information

Wind power is important because it is an alternative, renewable energy source. Supplies of fossil fuels are running out and nuclear power leaves behind hazardous byproducts. Alternative (to fossil fuel) energy sources include, among others, solar farms and wind farms. Wind farms are most effective when there is a relatively constant and relatively strong wind. This has led to wind farms being located offshore, where winds tend to be stronger and more reliable.

Although alternative energy sources are increasingly popular, some are opposed to offshore wind farms because of possible negative potential impacts on the environment. For example, some have argued that offshore wind turbines might negatively impact marine life, might negatively impact migrating birds, might interfere with navigation for endangered and threatened species, might alter natural habits, might emit harmful electrical and/or magnetic fields, cause unwanted noise and ruin the natural visual beauty of the shore.

Although many of these impacts are speculative and unproven, I believe that offshore wind farms look ugly. Wind generators ruin the natural beauty of the horizon, where the sea meets the sky. Therefore, it would be helpful to reduce the visual impact of offshore wind farms. Doing so should increase their acceptance by the public.

One possible solution would be to simply move wind farms further offshore, perhaps beyond the horizon visible from land. However, moving the wind farms further offshore requires the power generated to be transmitted over greater distances. Unfortunately, this increases both costs and energy losses. Therefore, it would be helpful to reduce the visual impact of offshore wind farms without needing to locate them too far from land.

§2. SUMMARY OF THE INVENTION

My invention includes a wind turbine comprising (a) a plurality of blades, and (b) a base supporting the plurality of blades and having a first portion provided with a first type of camouflage and a second portion provided with a second type of camouflage that differs from the first type of camouflage.

Such a wind turbine may be included in a system further comprising at least one light emitting element which, when activated, directs light onto a surface of the wind turbine; a power source for powering the at least one light emitting element; and a controller for controlling at least one of (A) a quantity, (B) a color, and (C) a pattern, of light emitted by the at least one light emitting element.

§3. BRIEF DESCRIPTION OF THE DRAWINGS

Referring to FIG. 6A-8B illustrate how one or more light emitting elements (also referred to as "light sources") may be used to reduce the visibility of wind generator(s) by reducing the visual impact of shadows.

§4. DETAILED DESCRIPTION

My invention involves using camouflage to decrease the visual impact of offshore wind farms. The science behind camouflage is first introduced in §4.1. Problems specific to camouflage in a marine setting are then discussed in §4.2. Next, example embodiments of my invention, which may use horizon-based camouflage, are described in §4.3. Then, example refinements that may be used are described in §4.4. Finally, some conclusions about various example embodiments consistent with my invention are described in §4.5.

§4.1 Camouflage Background

Camouflage has been used by animals to avoid predators or to trap unwary prey. In the military, the camouflage is worn by soldiers. Hunters also use camouflage.

Conventional camouflage clothing uses both color and pattern to help conceal a person. Camouflage material is colored with dull hues that match the predominant colors of the surrounding environment. In jungle warfare, camouflage is typically green and brown, to match the forest foliage and dirt. In the desert, military forces use a range of tan colors. Camouflage for snowy climates is colored with whites and grays. It may be desirable to contrast colors with dark and light shades so that the camouflage blends into the natural reflections and shadows that people are used to seeing.

Camouflage material may be a single color, but often has several colors mixed together to form a pattern that it is visually disruptive, thereby helping to hide the outline of the body or object sought to be hidden. When people view mottled camouflage in a matching environment, their brain tends to combine the lines of the colored blotches with the lines of the trees, ground, leaves and shadows. This is because when people view a scene, they are gathering an immense amount of information with their eyes. To make sense out of this large amount of information, the brain tries to break down the scene into component parts. People's brains also favor continuity when analyzing visual information. Humans tend to recognize something as a separate object if it has one continuous color, so a person is much more likely to stand out when wearing a single color than when wearing a jumble of colors. Camouflage exploits these aspects of human perception to help people go undetected even though they are "in plain sight."

More recently, digital patterns have been used to recreate shapes found in nature that people perceive as mere background noise. Such shapes may be referred to as "fractals". In some more modern camouflage, pixels break up the fabric into a macropattern and a micropattern, so the design doesn't appear as a solid block. Gradients and layers of color may be also be used so that a camouflage patter is perceived as a textured surface with depth. ADS of Virginia Beach, Va. sells this type of camouflage.

ADS reports that objective studies conducted by the U.S. Military concluded that a digital pattern, when applied correctly, reduces detectability by nearly 50% when compared to more traditional "Analog Shaped" 3-color NATO patterns and un-patterned targets. Current Digital Patterns (such as MARPAT and CADPAT for example) use square and rectangular pixels but the small size of both the larger Macropattern (Spatial Frequency—blotches) and Micropattern (pixels) in these two patterns tend to blend into one color at tactical combat distances. ADS states that digital patterns outperform analog (non-pixelated) shapes because they are superior at recreating natural fractals (geometric shapes found in nature) which the brain interprets as background noise. Digital patterns also generate advanced micropatterns and macropatterns.

Some of the requirements to blend into various scenes at various distances might not be necessary for my invention since the point of view of, and distances to, offshore wind farms are often relatively constant. Indeed, ADS reports that fractals could be represented by analog shapes to approach complete mimicry, which can work in a very specific environment. This is because mimicry patterns look out of place in anything but the environment it was designed to operate in, whereas a fractal digital pixel pattern has been refined to not only work across multiple backgrounds but also disrupt the human shape and human movement even when the pattern may not blend in completely across a particular environment by preventing the brain from detecting and recognizing a shape. Thus, example embodiments consistent with my invention can use either digital or analog fractals (though analog fractals may be preferable since the environment is relatively stable).

The predominant colors used in camouflage may be contrasted with a darker color of the region to allow the pattern to break up. A smaller percentage of the color spectrum may be used for a lighter shade which is perceived as natural reflections or gaps in the pattern and the darkest shade which is perceived as shadows or holes in the pattern. ADS has reported that using a large pixel (square) macropattern format for the lightest areas and darkest areas that has proven to be quite effective, noting that this macropattern also has a smaller fractal micropattern of its own with smaller square pixels which are present around the borders of the large squares.

Thee-dimensional layering may be used to create a boundary luminance gradient between colors, creating an illusion of three-dimensional layering and depth.

Kryptek Outdoor Group ("Kryptek") of Fairbanks, Ak. uses 3-D layering featuring two levels—(1) shading in the background and (2) sharp random shapes in the foreground. These two layers of patterns incorporate background transitional shading and sharp random geometrical foregrounds to create a three dimensional effect. Kryptek also uses a light-reflecting gradient to help creates a three-dimensional illusion that blends into natural terrain.

Once a camouflaged person is spotted, he or she stands out, and it seems strange that the person wasn't noticed before. This is because the brain is now processing the visual scene differently.

§4.2 Camouflage in a Marine Setting

Although one or more of the various techniques (fractals, digital camouflage, layering to obtain three-dimensions, etc.) described in §4.1 above may be employed in example embodiments consistent with my invention, since marine camouflaging raises additional challenges, some of these techniques which work well for camouflaging solders in the forest, in the desert, in the mountains, etc., might not work as well in a marine setting.

For example, camouflaging warships has proved to be more difficult because they are always floating on a wide background that has a uniform color. So called "dazzle" camouflage obscures the direction of travel of a ship (but not the ship itself) by using many colored geometric shapes jumbled together. In this way, dazzle camouflage makes it difficult to perceive the actual outlines of the ship.

§4.3 Camouflage of Offshore Wind Generators and Wind Farms

Figure 1:
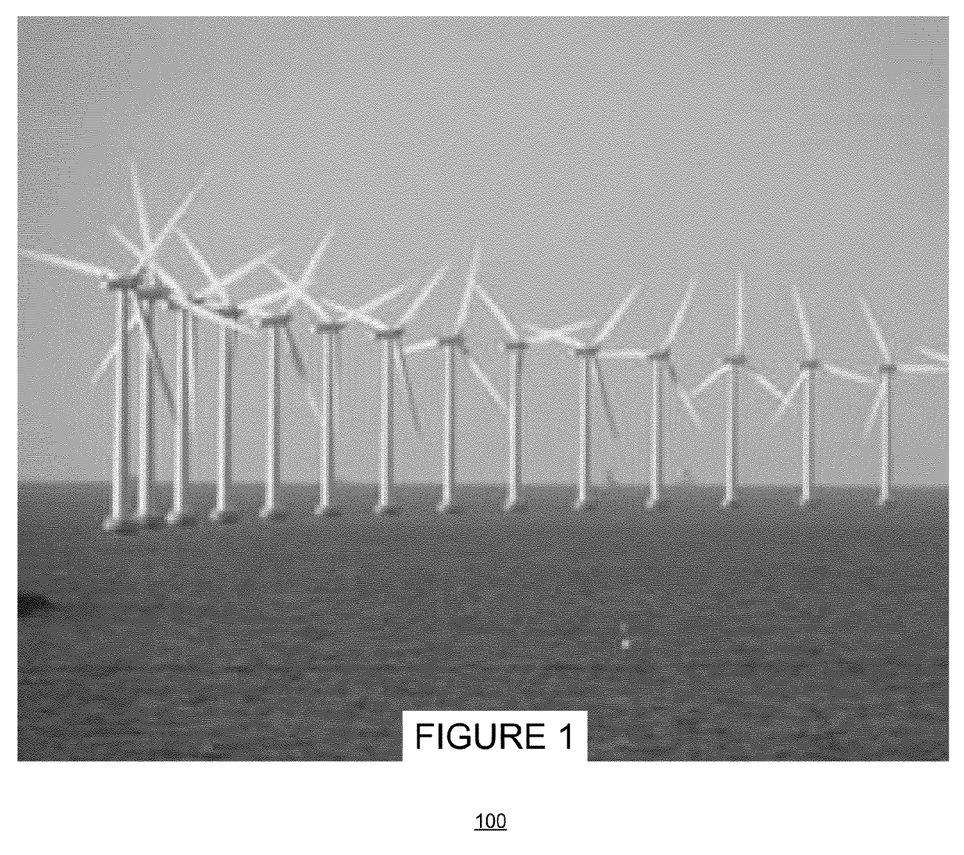
FIG. 1 shows an offshore wind farm as seen from a certain point of view.

FIG. 1 shows an offshore wind farm 100 as seen from a certain point of view. Notice that the various wind generators have a portion below the horizon and a portion above the horizon from this point of view. Notice also that the white color of the wind generators stands out against both the darker sea and the sky. Some example embodiments consistent with my invention may apply two types of camouflage (having different colors and/or different patterns); one at areas seen above the horizon and another at areas seen below the horizon.

Figure 2:
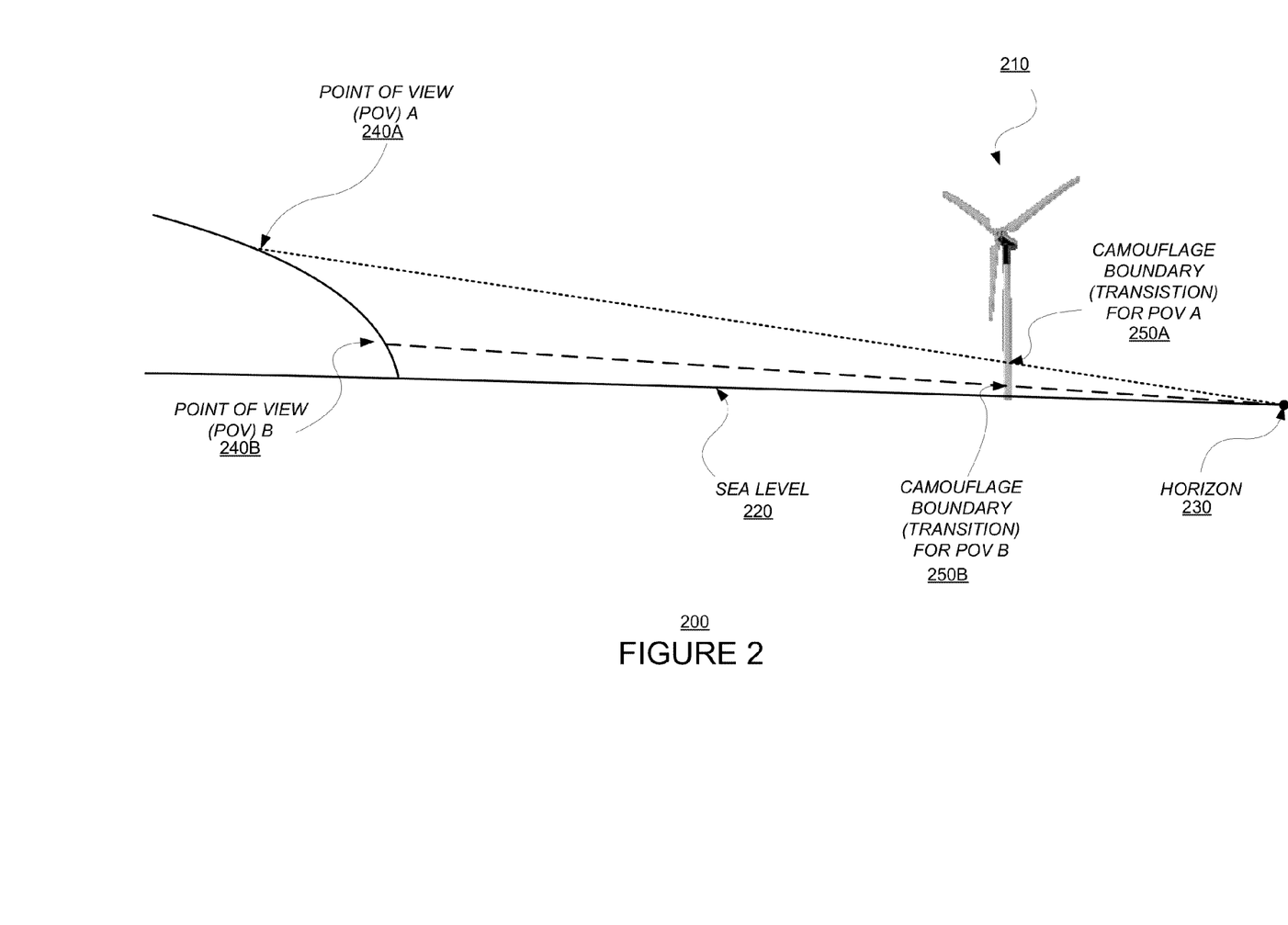
FIGS. 2, 3A and 3B illustrate the affect of a point of view on where to locate the boundary (or transition) between the two different types of camouflage on a wind generator.
Figure 3A:
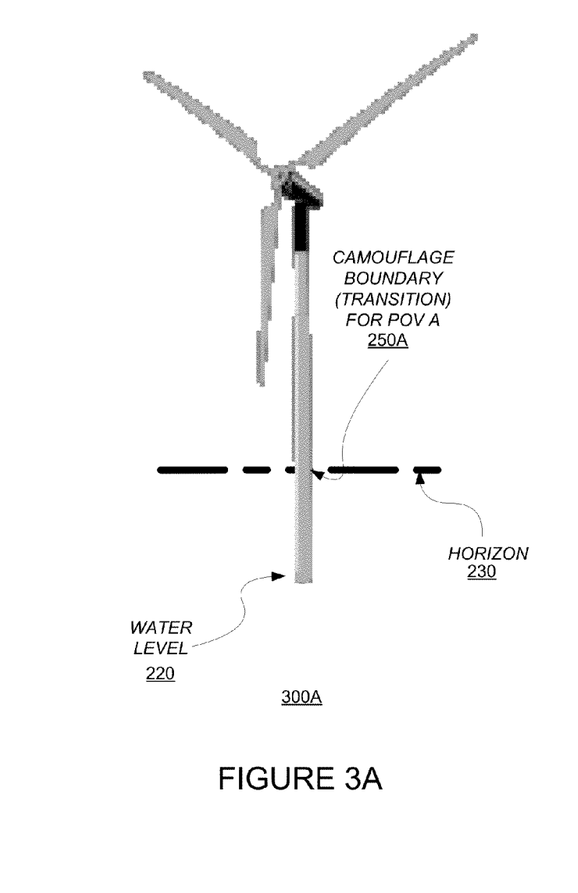
Figure 3B:
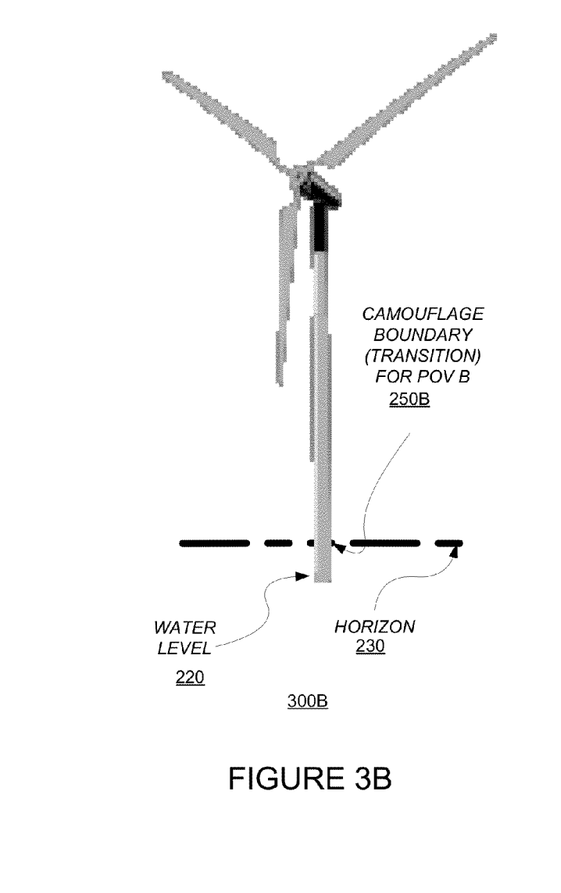

FIG. 2 illustrates the effect of a point of view (POV) on where to best locate the boundary (or transition) between the two different types of camouflage on a wind generator. A higher point of view (POV A) 240A results in a higher boundary between the two different types of camouflage, as can be seen from the intersection of the dotted line 250A (from POV A 240A to the horizon 230) with the wind generator 210. (See also, FIG. 3A.) On the other hand, a lower point of view (POV B) 240B results in a lower boundary between the two different types of camouflage, as can be seen from the intersection of the dashed line 250B (from POV B to the horizon 230) with the wind generator 210. (See also, FIG. 3B.) In many instances, most people will view the horizon from a similar height, for example, from a relatively flat beach, from a boardwalk, from a cliff, from a road or parking area, etc. A "most popular" viewing height can be used to locate an appropriate boundary (or transition) between the two different types of camouflage.

Figure 4A:
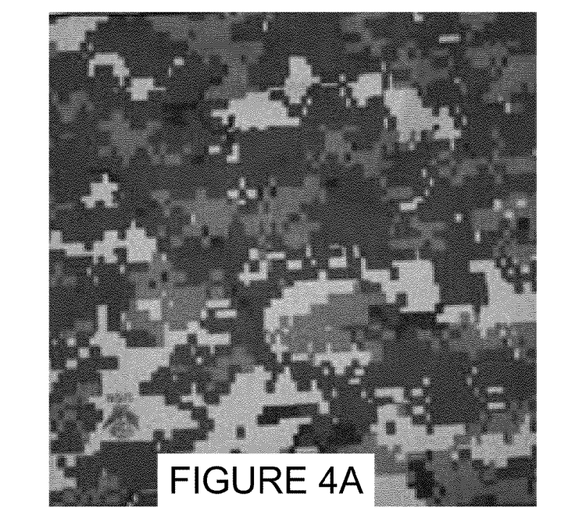
FIGS. 4A-4C illustrate different types of example camouflage patterns that may be used.
Figure 4B:
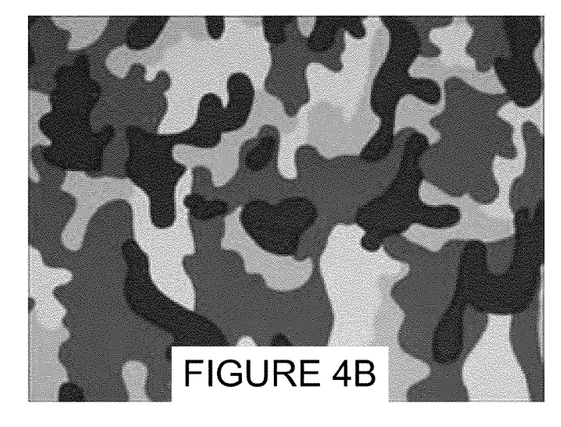
Figure 4C:
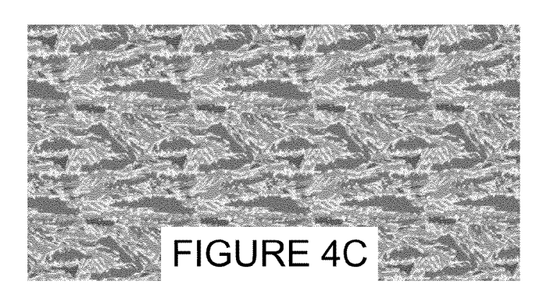

The different types of camouflage may differentiated by different colors and/or different patterns. FIGS. 4A-4C illustrate different types of camouflage patterns that may be used. More specifically, FIG. 4A illustrates a multi-color (and/or multi-shade) digital, pixilated camouflage pattern, while FIGS. 4B and 4C illustrate different multi-color (and/or multi-shade) analog camouflage patterns. Other types of camouflage, such as camouflage using one or more of the various techniques (fractals, digital camouflage, layering to obtain three-dimensions, etc.) described in §4.1 above may be employed in example embodiments consistent with my invention. However, as noted above, since camouflaging in a marine setting raises additional challenges, some of these techniques which work well for camouflaging solders in the forest, in the desert, in the mountains, etc., might not work as well in an environment with wide background that has a uniform color. Therefore, camouflage colors and/or patterns specifically designed for ocean or sea water, and camouflage colors and/or patterns specifically designed for the sky, may be used. The specific type of camouflage to be used may vary based on the particular visual aspects of the site.

§4.4 Camouflaging Shadows

Figure 5A:
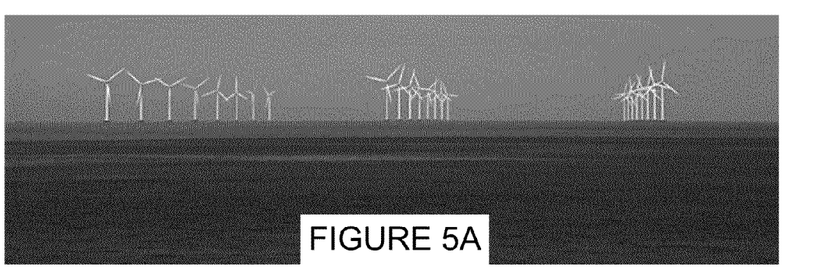
Referring to FIGS. 5A-5C collectively show the visual impact of shadows on wind farms.

Referring to FIG. 5A, it may be desired to darken the coloring of a white wind generator against a blue sky (or darker blue water). However, the sky does not remain constant. Under certain weather conditions and/or at certain times, at least some parts of the wind generators may become darker than the sky in the background, for example, due to shadows. Features, which may be used alone or in combination, for removing or obscuring shadows are described in §§4.4.1 and 4.4.2 below.

§4.4.1 Lighting (With Feedback)

Figure 5B:
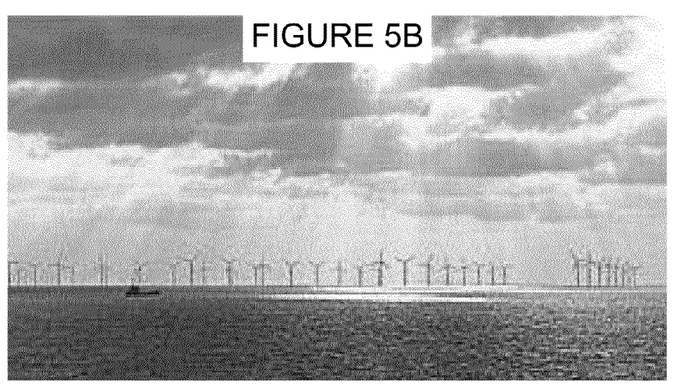
Figure 5C:
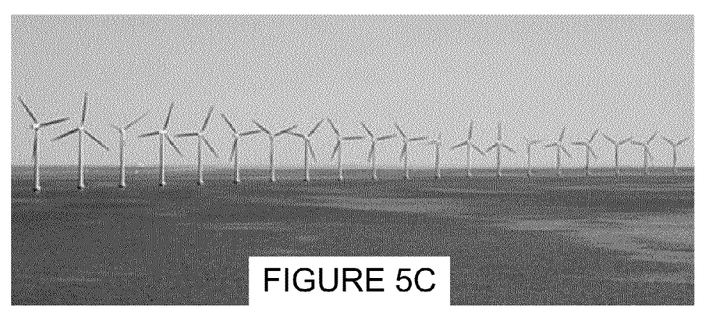

To obscure or eliminate shadows (such as those seen in FIGS. 5B and 5C), some or all surfaces of a wind generator may be lit. For example, at least one light source provided off of, and/or on, a wind generator may be used to obscure or eliminate visible shadows. As one example, one or more light sources may be located in front of the wind generator (e.g., between the POV and the wind generator) to "wash" at least some surfaces of one or more wind generators with light, thereby obscuring or eliminating shadow. As another example, one or more light sources may be located on a wind generator to "wash" at least some surfaces of the wind generator with light, and/or to have the wind generator reflect light. The light may itself be colored, and/or have a multicolored pattern, a multi-intensity pattern, and/or a multi-shaded pattern.

Figure 6A:
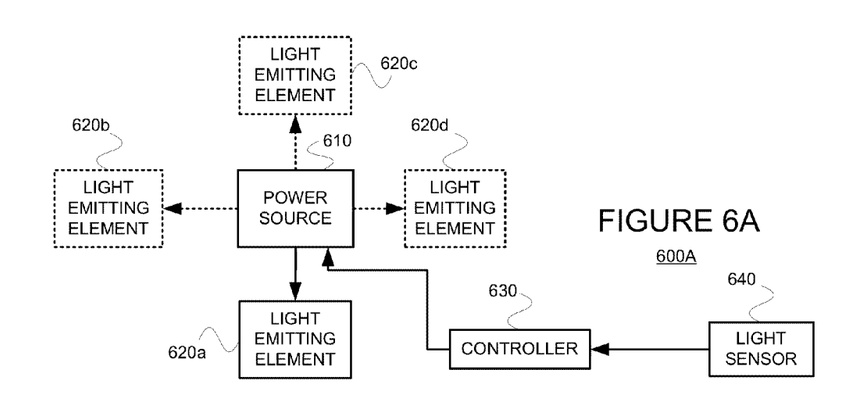
Figure 7A:
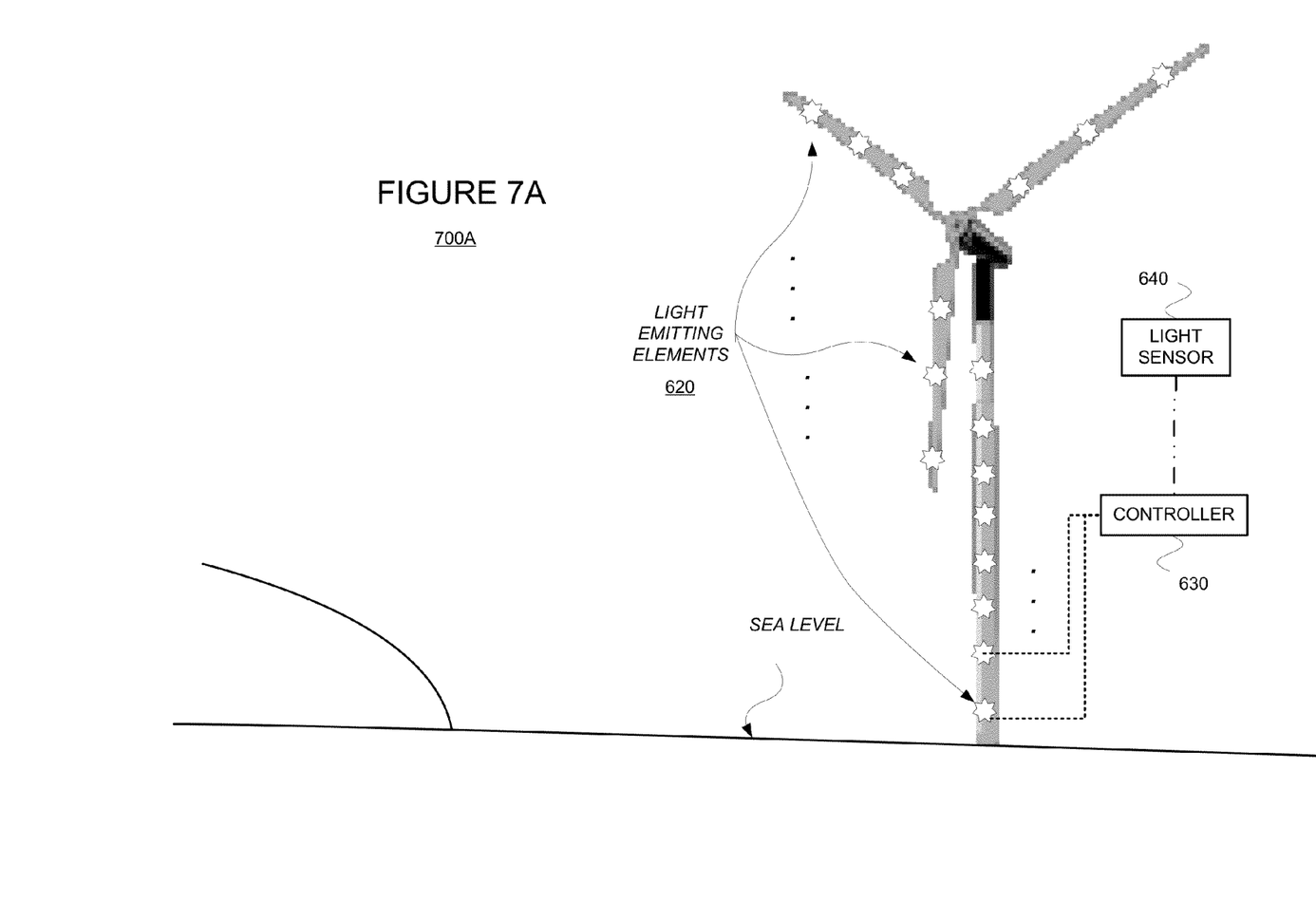

Referring to FIGS. 6A and 7A, a power source 610 may provide power to one or more light emitting elements (also referred to as "light sources") 620. A controller 630 may be provided with an input signal from a light sensor 640 so that under certain conditions, the controller 630 can turn on (and perhaps control the intensity of, color of, and/or orientation of) the one or more lighting elements 620. A clock, a timer, or some other means of determining a time of day, or time of sunrise, sunset, or some other position of the sun with respect to the wind farm, may be used instead of, or in concert with, the light sensor 640 to provide further information to the controller 630.

Figure 6B:
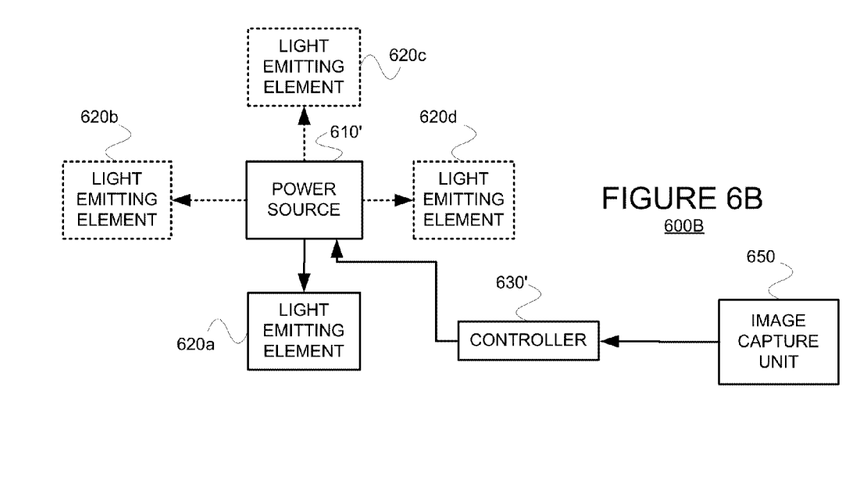
Figure 7B:
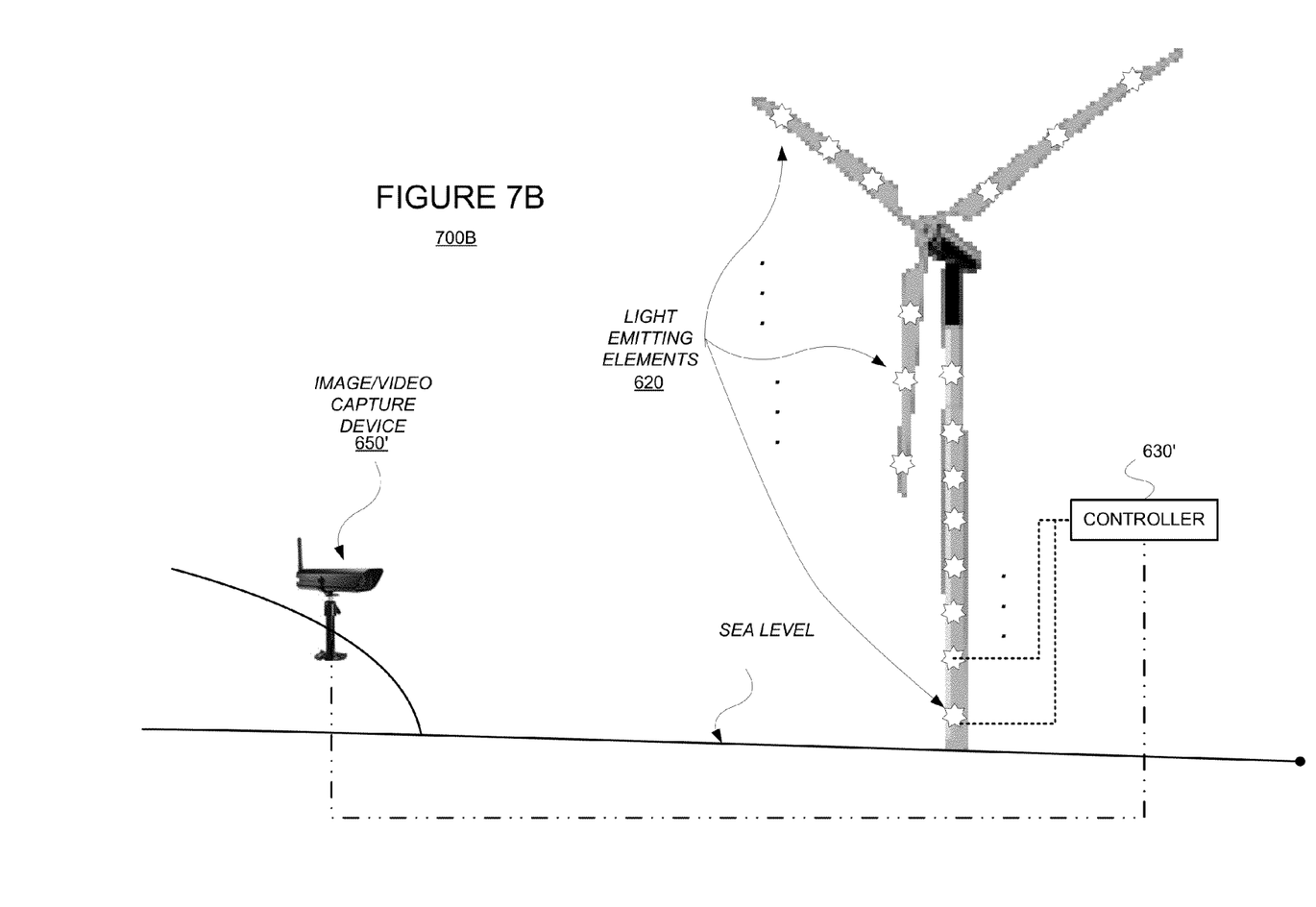

Referring to FIGS. 6B and 7B, as was the case with FIG. 6A, a power source 610' may provide power to one or more light emitting elements 620. However, in this case, the controller 630' may be provided with an input signal from an image capture unit 650 (e.g., a digital camera or a digital video camera). The image capture unit 650 should be located so that it will view the wind farm as close as possible to the way it will be viewed by people on land. The controller 630' can then turn on (and perhaps control the intensity of, color of, and/or orientation of) the one or more lighting elements 620. A clock, a timer, or some other means of determining a time of day, or time of sunrise, sunset, or some other position of the sun with respect to the wind farm, and/or the light sensor may be used in concert with the image capture unit to provide further information to the controller 630'. A feedback loop (or control loop) may be used to adjust the light emitting element(s) in a way that reduces the visibility of the wind generator(s) as captured by the image capture device 650.

Note that although FIGS. 7A and 7B illustrate a number of light emitting elements 620 on the wind generator, less light sources can be provided on and/or off the wind generator to "wash" surface(s) of the wind generator with light. For example, FIG. 8A illustrates a wind generator pole 810 provided with left and right base light sources 820b and 820c on (or just off) the base of the wind generator, and/or front-left and front-right light sources 820a and 820d provided at a distance from the pole 810 of the wind generator.

Figure 8A:
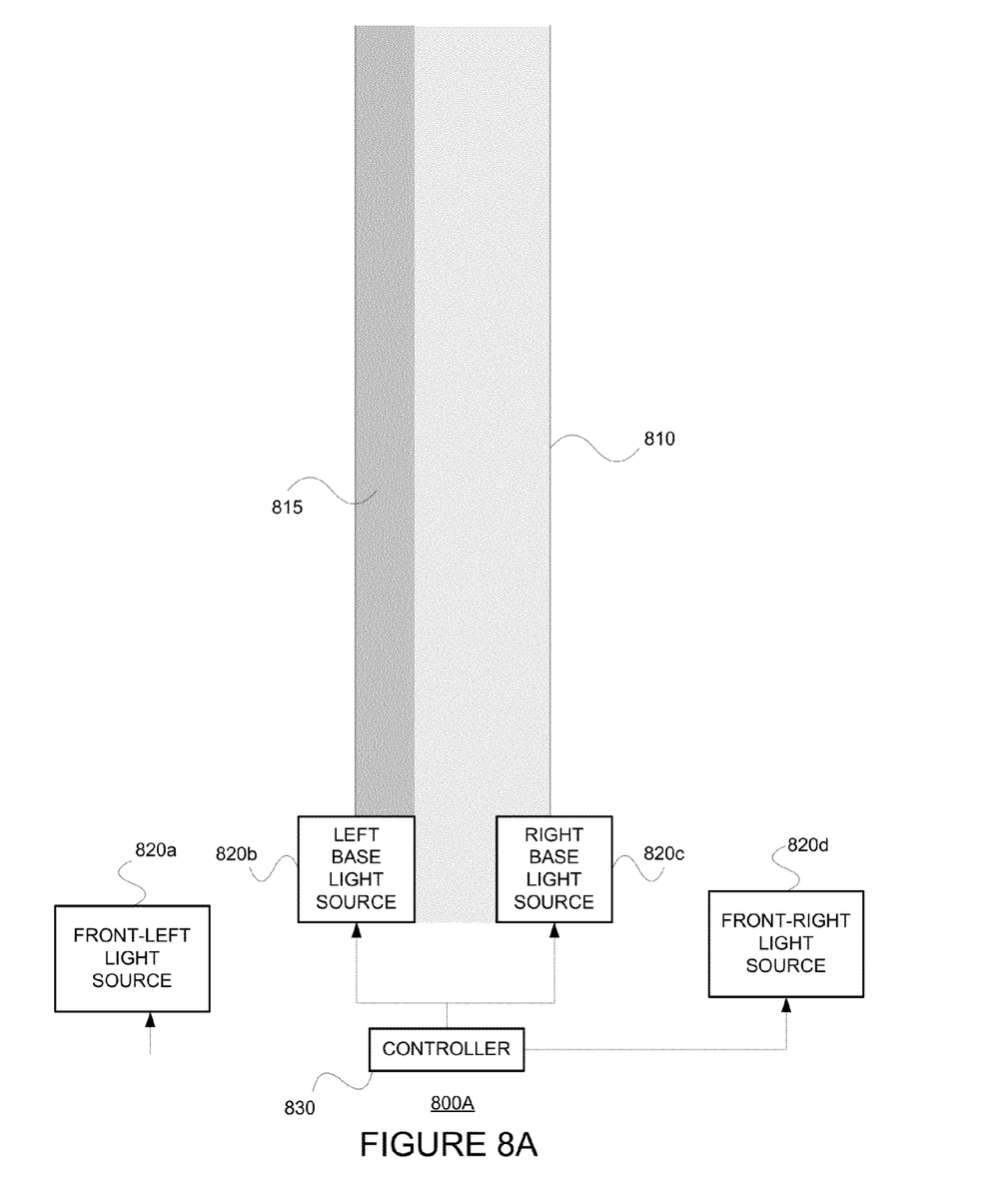
Figure 8B:
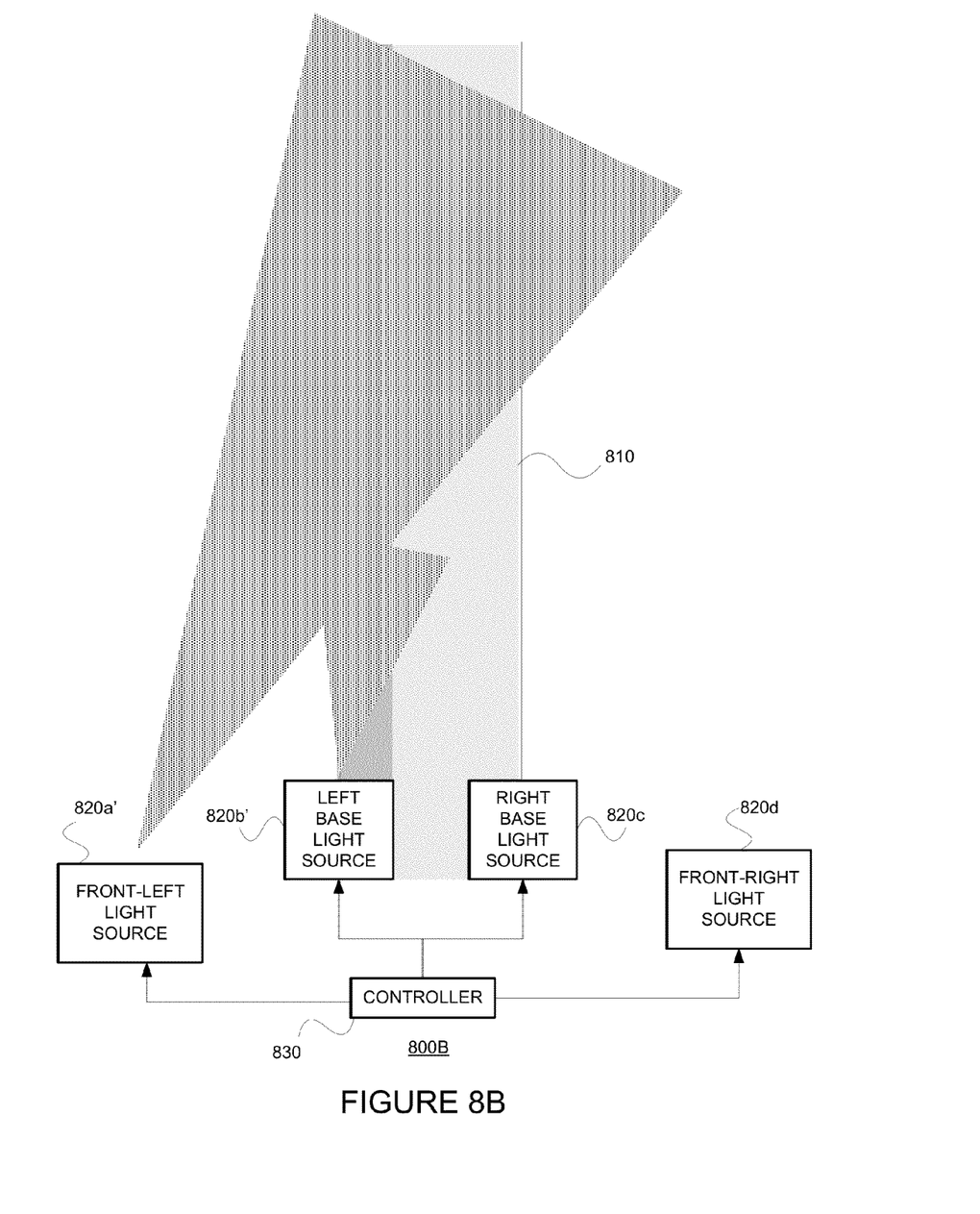

As shown in FIG. 8A, there is a shadow 815 on the left side of the pole 810. As shown in FIG. 8B, the controller 830 may operate the front-left light source 820a' and/or the left base light source 820b' to wash the left side of the wind generator pole 810 with light, thereby eliminating or obscuring the shadow 815. The controller 830 may control the respective intensity of the light source(s), a color of light emitted by the light source(s), a pattern (e.g., multi-color pattern, and/or multi-intensity pattern, and/or multi-shaded pattern) of light emitted by the light source(s), and/or an orientation (which affects a direction of (the emission axis)) of the light source(s).

The light emitted by the light sources can be uniform. However, in some example embodiments consistent with my invention, the color of the light may change with time or may be different for different parts (e.g., base pole versus blades, etc.) of the wind farm.

The controller may control one or more of the intensity of the light source(s), the color of light emitted by the light source(s), an intensity of light emitted by the light source(s), a direction of light emission of the light source(s), and/or a pattern of light emitted by the light source(s). The light sources may be controlled collectively (in groups), or individually.

A pattern may be provided to light emitted by the light source(s). This pattern may work in concert with a camouflage pattern (Recall, e.g., FIGS. 4A-4C) painted on, or otherwise applied to, the wind generator to generate a more complex camouflage pattern.

Referring to FIGS. 6A-8B, the communication of information among the various components may be done wirelessly, or via a physical connection (e.g., optical fiber, copper wire, etc.).

§4.4.2 Spray/Mist (With Feedback)

Figure 9:
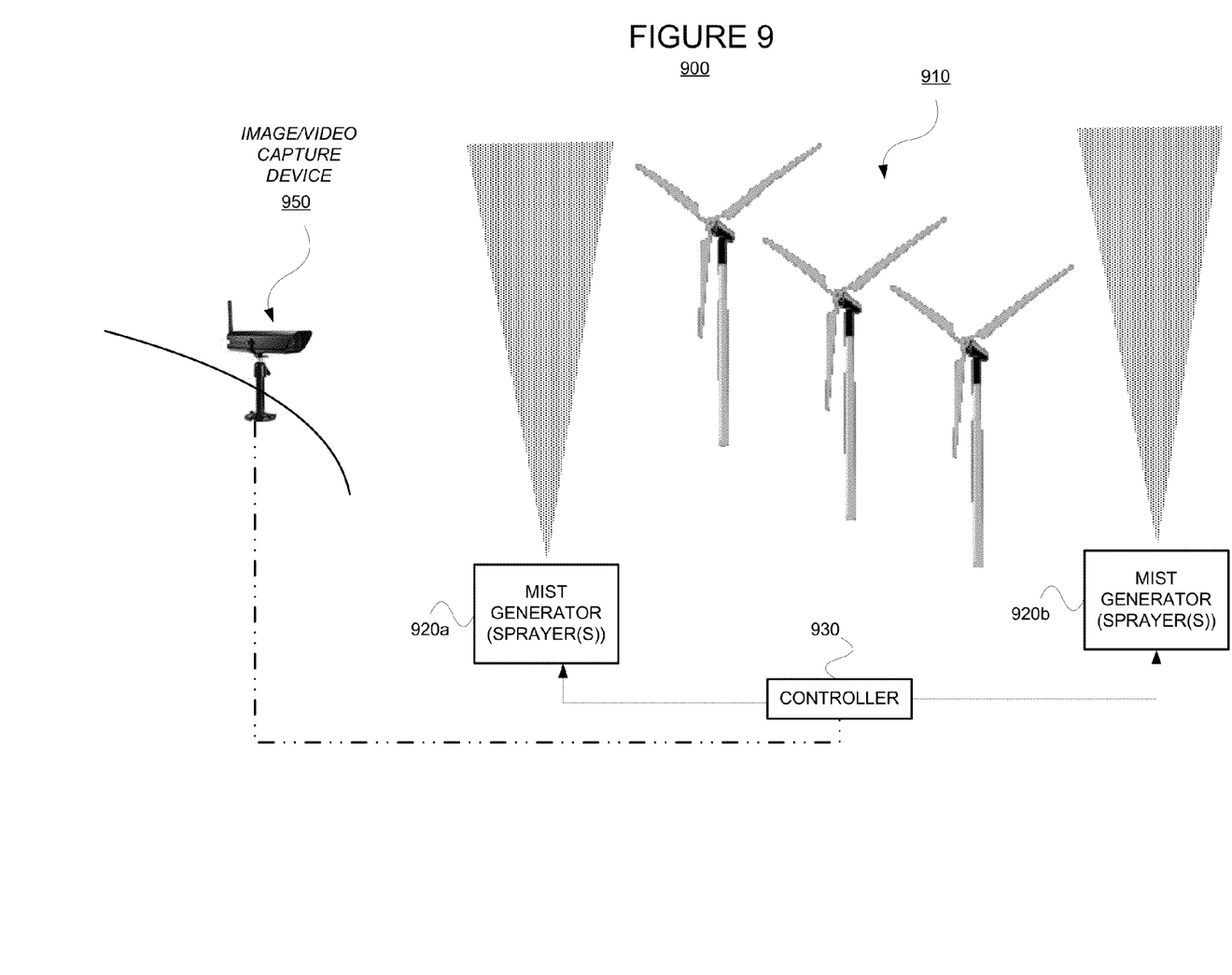
FIG. 9 illustrates the use of one or more mist generators to generate a mist or cloud in front of a wind farm, and/or behind the wind farm.

The military has employed "smoke screens" to block the path of light, imparting a sort of invisibility to whatever is behind the smoke screen. It has been reported that the British shipbuilder Vosper Thorneycroft has developed a system that uses a series of water nozzles to produce a constant fog all around a ship, obscuring it from view. Referring to FIG. 9, at least some example embodiments consistent with my invention may use one or more mist generators 920 to generate a mist or cloud in front of the wind farm 910 (e.g., to obscure one's view of the wind farm and/or to change the front lighting of the wind farm), and/or behind the wind farm 910 (e.g., to change the backlighting on the wind farm). Although not shown, mist generators 920 may be positioned elsewhere (e.g., to change side lighting of the wind farm). The controller 930 may use data from an image capture device 950, for example in a feedback loop (or control loop), to minimize the visual impact of the wind farm 910. In FIG. 9, the communication of information among the various components may be done wirelessly, or via a physical connection (e.g., optical fiber, copper wire, etc.).

§4.4.3 Edge Disruption (Physical or with Markings)

Figure 10A:
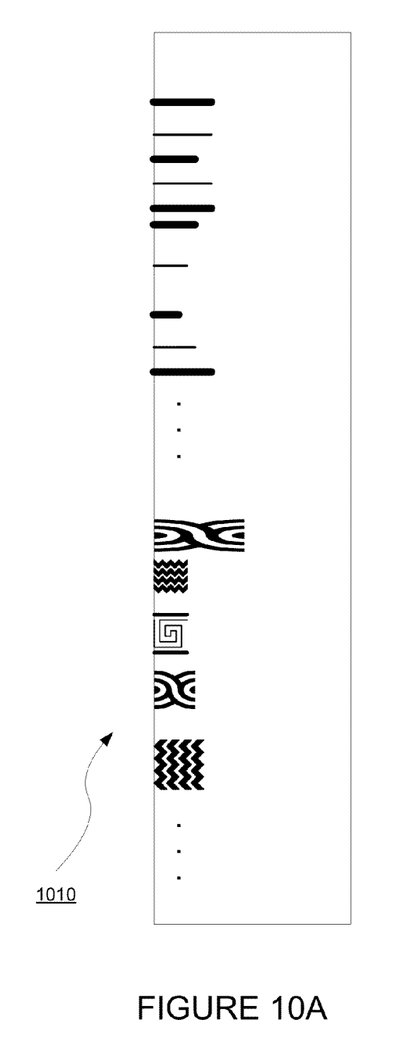
FIGS. 10A and 10B illustrate the use of markings and a physical material with a varying edge, respectively, to "break-up" long, straight and continuous visual edges.
Figure 10B:
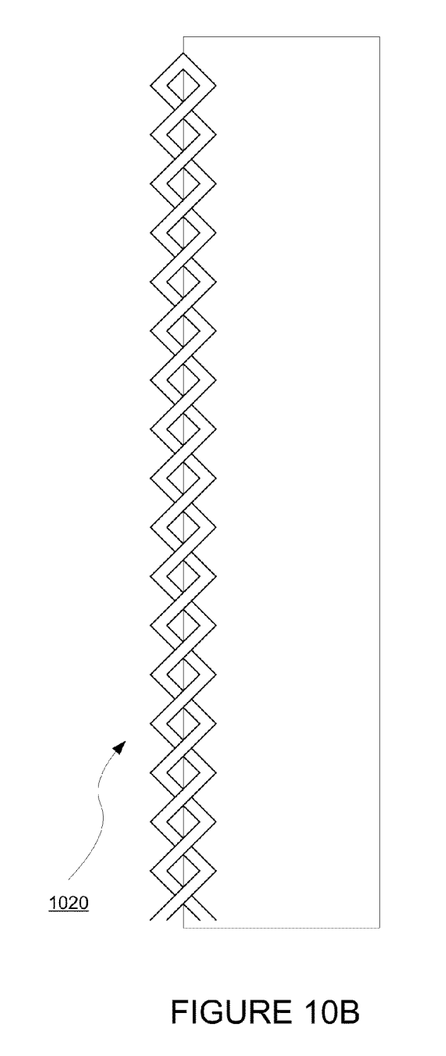

Since a wind generator creates many long, continuous and straight visual edges between its surfaces and the background, markings 1010 (as shown in simplified form on the left side of FIG. 10A) and/or a physical material with a varying edge 1020 (as shown in simplified form on the left side of FIG. 10B) may be applied to "break-up" such long, straight and continuous edges (as shown on the right sides of FIGS. 10A and 10B). For the blades, it might be preferred to use markings only. The markings may include lines, curves, geometric patterns, and/or fractal patterns, of various widths, lengths and shades.

§4.4.4 Application of Camouflage

In some example embodiments consistent with the present invention, the first and/or second types of camouflage may be applied directly to the wind generator (e.g., as paint, as a covering, etc.). Alternatively, or in addition, the first and/or second types of camouflage may be projected onto the wind generator.

§5. CONCLUSIONS

Any of the foregoing features may be used separately, or in concert, to reduce the visual impact of offshore wind farms. Although the term "boundary" was used, a transitional area may be provided between two different types of camouflage. Even though some example embodiments illustrated image capture devices located on land, this isn't necessary.

What is claimed is:

1. A wind turbine comprising:
   a) a plurality of blades; and
   b) a base supporting the plurality of blades and having a first portion provided with a first type of camouflage and a second portion provided with a second type of camouflage that differs from the first type of camouflage,
   wherein the first and second portions of the base define a substantially horizontal border,
   wherein the wind turbine is installed at an offshore site, and
   wherein the substantially horizontal border is aligned with a water-sky horizon at a particular on-shore point of view.

2. The wind turbine of claim 1 wherein the first type of camouflage has a first color and the second type of camouflage has a second color which differs from the first color.

3. The wind turbine of claim 1 wherein the first type of camouflage has a first pattern and the second type of camouflage has a second pattern which differs from the first pattern.

4. The wind turbine of claim 3 wherein the first type of camouflage has a first color and the second type of camouflage has a second color which differs from the first color.

5. The wind turbine of claim 3 wherein at least one of the first and second patterns has both a micropattern and a macropattern.

6. The wind turbine of claim 3 wherein at least one of the first and second patterns has three dimensional layering.

7. The wind turbine of claim 1 wherein the base includes a base pole that is provided with markings that break up an otherwise long, straight continuous visual edge of the base pole at the particular on-shore point of view.

8. The wind turbine of claim 1 wherein the base includes a base pole that is provided with a varying edge that breaks up an otherwise long, straight continuous visual edge of the base pole at the particular on-shore point of view.

9. The wind turbine of claim 1 wherein the first type of camouflage visually mimics water of one of a lake, a sea, or an ocean.

10. The wind turbine of claim 1 wherein the second type of camouflage visually mimics sky.

11. The wind turbine of claim 10 wherein the first type of camouflage visually mimics water of one of a lake, a sea, or an ocean.

12. The wind turbine of claim 1 wherein at least one of the first and second types of camouflage is applied directly to the wind generator as paint, or as a covering.

13. The wind turbine of claim 1 wherein at least one of the first and second types of camouflage is projected, from at least one light source, onto the base.

14. The wind turbine of claim 1 wherein the particular on-shore point of view is based on relative popularities of viewing heights.

15. The wind turbine of claim 1 wherein the particular on-shore point of view is based on a most popular viewing height.

16. A system comprising:
   a) wind turbine including
      i) a plurality of blades, and
      ii) a base supporting the plurality of blades and having a first portion provided with a first type of camouflage and a second portion provided with a second type of camouflage that differs from the first type of camouflage;
   b) at least one light emitting element which, when activated, directs light onto a surface of the wind turbine;
   c) a power source for powering the at least one light emitting element;
   d) a controller for controlling at least one of (A) a quantity of light emitted by the at least one light emitting element, (B) a color of light emitted by the at least one light emitting element, and (C) a pattern of light emitted by the at least one light emitting element; and
   e) an image capture unit for capturing an image of the wind turbine and for providing a signal, derived from the captured image, to the controller.

17. The system of claim 16 wherein the at least one light emitting element is provided on the wind turbine.

18. A system comprising:
   a) wind turbine including
      i) a plurality of blades, and
      ii) a base supporting the plurality of blades and having a first portion provided with a first type of camouflage and a second portion provided with a second type of camouflage that differs from the first type of camouflage;
   b) at least one light emitting element which, when activated, directs light onto a surface of the wind turbine;
   c) a power source for powering the at least one light emitting element; and
   d) a controller for controlling at least one of (A) a quantity of light emitted by the at least one light emitting element, (B) a color of light emitted by the at least one light emitting element, and (C) a pattern of light emitted by the at least one light emitting element,
   wherein the at least one light emitting element is provided spaced from the wind turbine.

19. The system of claim 18 further comprising:
   e) a light sensor for capturing an amount of light in an environment including the wind turbine and for providing a signal, derived from the amount of light captured, to the controller.

* * * * *